United States Patent Office 3,420,809
Patented Jan. 7, 1969

3,420,809
CATALYST FOR ETHYLENE POLYMERIZATION
Erik Tornqvist, Roselle, N.J., assignor to Esso Research and Engineering Company, a corporation of Delaware
No Drawing. Continuation-in-part of application Ser. No. 161,353, Dec. 22, 1961. This application Aug. 12, 1966, Ser. No. 572,001
U.S. Cl. 260—94.9          19 Claims
Int. Cl. C08d 1/30; B01j 11/78

This application is a continuation-in-part of Ser. No. 161,353 filed Dec. 22, 1961, which in turn is a continuation-in-part of Ser. No. 65,595, filed Oct. 28, 1960 both now abandoned.

This invention relates to improved catalysts for polymerizing ethylene, their method of preparation and their use in the polymerization process.

The use of the so-called Fischer catalyst system of aluminum metal, aluminum chloride, and titanium tetrachloride for polymerizing ethylene to solid polymers is well known. It is also well known that the catalyst efficiency and yield of solid polymer can be increased over those reported by Fischer by using larger amounts of aluminum. Despite the increased concentrations of aluminum, it has still not been possible to achieve commercially attractive results by further improving catalyst efficiencies so as to simplify deashing problems through the reduction of catalyst quantity requirements so as to increase the amounts of solid crystalline polymer obtained.

It has now been found and forms the basis for this invention that improved catalysts of the nature indicated can be prepared by a method which consists of intimately grinding finely divided aluminum powder with at least a portion of the aluminum chloride component of the catalyst and then admixing the resulting ground material with the remaining transition metal tetrahalide.

It is extremely significant that the intimate contacting occurs in the absence of added liquid diluent and the transition metal halide, and this is the reason for the term "consists" as applied to that step. The presence of diluent prevents the intimate contacting and physical force necessary to change the microstructure of the aluminum so as to achieve the darkening which is essential as pointed out later herein.

Moreover, the presence of the AlCl₃ acts as a grinding aid and permits dry grinding of the mixture. It has not been possible to only grind Al powder alone. The superiority of that procedure as contrasted with the results obtained when the transition metal halide and/or added diluent are present during the contacting, is indeed surprising. The benefits obtained are much greater than would be expected from merely removing any oxygenated coating from the aluminum surface or merely increasing that surface. There is reason to believe that some unique reaction takes place between aluminum and AlCl₃ at the surface of the metal. This reaction, however small, probably results in the formation of some unusually active metallic species which trigger the reaction necessary for good catalyst activity in the Fischer system. That a reaction takes place at the surface of the metal is indeed indicated by the strong deepening of the color of the light metallic powder during the grinding. However, whatever the mechanism, the unexpectedly great effect of preparing the catalyst according to the method of this invention is amply demonstrated herein and the mechanism does not limit the invention in any way. It is a feature of applicant's invention that the grinding is carried out for a sufficient length of time to achieve a darkening of the ground mixture. Generally, the darker the ground mixture the more efficient the resulting catalyst.

The components of the catalyst are used in the proportion of 0.1 to 5 moles and preferably 0.3 to 2 moles of AlCl₃ and 0.5 to 10 atoms (gram atoms), preferably 1 to 3 atoms of aluminum per mole of transition metal chloride selected from the group consisting of TiCl₄, TiBr₄ and VCl₄. More than 10 atoms of aluminum per mole of transition metal compound can also be used for making a highly active catalyst, but in such cases a large part of the aluminum will not take part in the reaction and will be left unreacted in the polymer thus causing deashing problems.

When formulated according to the preferred ranges, the catalyst is particularly adapted for the polymerization of ethylene to the crystalline, plastic grade polymers desired.

The grinding is carried out by placing the two catalyst components in ball milling, pebble milling, roller milling or other equivalent grinding equipment and then grinding or milling in an inert atmosphere, such as nitrogen or argon atmosphere, which is free of oxygen, water vapor, and other catalyst poisons, at a temperature of from 0 to 175° C., preferably 15 to 100° C. and most preferably 15 to 50° C. Room temperature is usually perfectly satisfactory since there is no particular advantage gained by applying heat to the mixture while it is undergoing grinding. Several types of grinding media can be advantageously used, but chrome alloy steel balls have been found particularly suitable because of high milling efficiency, good abrasion resistance, ready availability and low cost. The optimum time period for the dry milling step depends in general on the efficiency of the equipment used. Ball milling times of from about 1 to 15 days are usually satisfactory.

The time period most suitable for any given milling or grinding equipment can easily be determined by routine experimentation. Such experimentation can involve test polymerizations or other reactions in which the reactivity of the aluminum is of primary importance. Another method of determining the grinding efficiency is by following the previously mentioned darkening of the color of the metal powder which takes place during the grinding. Thus, while air atomized aluminum powder and aluminum powder ground according to previously known methods, e.g., in the presence of a diluent or in the presence of a solid lubricant, has the normal light, silver-like metallic aluminum color, aluminum powder ground according to this invention will take on a color which may eventually be almost as dark as that of finely divided iron powder, even when as much as 65 wt. percent of normally colorless AlCl₃ is present. Of course, the color of the final product will be influenced by both the degree of grinding and the amount of AlCl₃ present so that each $n$Al–AlCl₃ composition will have its own typical grinding-color relationship.

The grinding efficiency will, of course, not only depend upon the type of grinding equipment used but also on other factors such as charge and equipment size. For instance, the grinding efficiency will normally increase with increasing ball mill size as long as optimum grinding conditions are used for each size. The grinding efficiency of ball mills may also be increased by allowing centrifugal force to act upon the balls as is the case in some modern ball milling equipment.

The aluminum is employed in the finely divided form, sometimes referred to as atomized, such as Alcoa Nos. 101, 120 and 123, having average particle diameters in the 16–25 micron range. However, coarser materials may also be advantageously used, since this new method of activating the aluminum powder will cause appreciable comminution of the material. Although longer grinding periods may be used for coarser materials, such as those having average particle diameters in the 50–100 micron range, the presence of less oxide in powders having less surface area may prove highly beneficial not only during the polymerization but also during the subsequent deashing of the polymer.

As stated previously, the aluminum is contacted with at least a portion of the $AlCl_3$ in the grinding step. This portion may vary within wide limits but it has been found that the grinding efficiency generally increases with decreasing amounts of $AlCl_3$ up to a point where a caking tendency begins to appear. For instance, a $12Al–1AlCl_3$ mixture may be efficiently ground for 4 days in a given type of equipment, but caking may start upon prolonged grinding so that fairly hard cakes or lumps are obtained after 14 days. Similarly an $8Al–1AlCl_3$ mixture may be efficiently ground for 6 days in the same equipment but may show fairly extensive caking after 12 days, even though it will not be as great as for the $12Al–1AlCl_3$ mixture. A $6Al–1AlCl_3$ mixture, on the other hand, may not exhibit any caking tendency whatsoever under the same conditions. If the conditions are changed somewhat, e.g., a larger mill or a vibromill is being used, the caking tendency may also disappear for the $8Al–1AlCl_3$ system.

An investigation of the milling efficiency, as demonstrated by the reactivity of the aluminum, will reveal, however, that as long as caking does not occur, the efficiency is greatest for the highest $Al/AlCl_3$ ratio, but since the overall activation is a function of both milling efficiency and time, there is an upper limit for the $Al/AlCl_3$ molar ratio which is best for preparing catalysts of improved activity for efficient polymerization of ethylene according to this invention. This upper limit appears to be at a ratio of about 12 when short milling times are to be used although higher ratios may be employed in equipment which gives less caking tendency than standard laboratory ball mills. However, an upper limit of 6–8 appears to be particularly suitable, since it allows extensive grinding without any undesirable caking taking place as long as the milling is carried out under otherwise suitable conditions.

Lower $Al/AlCl_3$ ratios may, of course, also be used for preparing the highly activated catalyst component, but in such cases longer milling times are needed for obtaining activity. In addition, at lower $Al/AlCl_3$ ratios, less aluminum will be activated per ball mill charge. It is therefore normally advantageous to carry out the activation by grinding at the highest $Al/AlCl_3$ ratio at which caking does not occur. Generally, a ratio of about $3Al–1AlCl_3$ represents a preferred minimum level.

In some cases it may nevertheless be desirable to mill all $AlCl_3$ required in the catalyst preparation together with the aluminum even though the $Al/AlCl_3$ ratio may then be considerably lower than 6. This could, for instance, make the final catalyst preparation easier since separate addition of additionally required $AlCl_3$ would not be necessary. In such cases, it may be advantageous first to ball mill all the aluminum with $AlCl_3$ at an $Al/AlCl_3$ ratio close to that of optimum grinding efficiency until desired activation has been accomplished and then add the $AlCl_3$ needed to obtain the final $Al/AlCl_3$ ratio and mill for the time needed for thorough mixing of the two components. Under such conditions the second milling period will usually be much shorter than the first and the total duration of the two periods will be considerably shorter than the time needed if the same activation should have been accomplished with the final $Al/AlCl_3$ ratio having been used from the beginning of the milling.

The additionally required $AlCl_3$, if any, plus the transition metal halide is then admixed with the activated $Al–AlCl_3$ mixture. This admixture is preferably accomplished by first dispensing the residual catalyst components in an inert hydrocarbon diluent of the aliphatic series, i.e., a straight or branched chain, $C_5$ to $C_{15}$ aliphatic hydrocarbon or a saturated cyclic hydrocarbon containing only the elements carbon and hydrogen. The quantities of diluent that can be employed range from 5 to 10,000 volumes of diluent per total volume of catalyst components. However, a small amount, e.g., from 0.01–5 volume percent of an aromatic diluent such as benzene or an alkyl benzene can be mixed into the aliphatic diluent under certain polymerization conditions.

It is important to note that the improved catalysts thus obtained makes it possible to use relatively small quantities of them in the polymerization reaction thus simplifying deashing problems. For instance, catalyst concentrations as low as 0.05–0.2 wt. percent of total monomer charged may be advantageously used with good monomer conversion still taking place.

Activating materials such as minute quantities of HCl, HBr, HI, water, alcohols, and organic acids, can also be employed if desired. In general, improved polymerization is possible if such activating materials are actually used.

When the catalyst has been prepared as stated, it is placed in the polymerization reactor with from 100 to 10,000 parts of hydrocarbon diluent of the nature indicated for catalyst preparation and from 1 to 20 weight percent of ethylene are injected therein. The reaction mixture is then heated to a temperature of 50 to 180° C., preferably 80 to 150° C., for a time of from 0.1 to 10 hours, preferably 0.5 to 4 hours, during which time more monomer may be added so as to maintain the total pressure at the desired level which may be as low as atmospheric and as high as 2,000 p.s.i.g. but preferably is in the range of 25 to about 700 p.s.i.g. The amount of ethylene thus added will, of course, be determined by catalyst activity, reaction time, diluent volume, desired monomer conversion, etc. but may advantageously be in the range of 50–300 g. monomer per g. total catalyst when the reaction is carried out batchwise. Normally it is desirable for good operability to limit the concentration of polymer in the diluent to less than 25 wt. percent. If necessary the polymer concentration may be maintained at or below this level by the addition of more diluent during the polymerization.

The polymerization may, of course, also be carried out as a continuous operation in which case the catalyst components, slurried in sufficient diluent, may be added to the reactor either separately or previously combined. Separate streams of additional diluent and of monomer are also continuously added so as to maintain a suitable polymer concentration in the diluent, preferably in the range of 5–25 wt. percent, achieve desirable monomer conversion, and obtain a high catalyst efficiency, i.e., in the range of 50–500 g. polymer per g. catalyst. At the end of the reaction the solid polymer is precipitated with about an equal quantity of a $C_1$ to $C_6$ alcohol such as ethyl alcohol, isopropyl alcohol, n-butanol, and the like. The precipitated product is then filtered and washed with more alcohol, advantageously containing dry HCl or another suitable acid to facilitate the deashing, the removal of traces of unreacted aluminum in particular. The filtration and deashing step may be repeated one or more times if needed to obtain desirably low ash levels. The polymer may then be finished by the addition of suitable methods now well known in the polymer field. stabilizers and inhibitors followed by drying according to The polyethylene prepared has a molecular weight in the range of about 100,000 to 3,000,000 (Staudinger) depending upon catalyst composition and polymerization conditions, and will thus cover all important useful molecular weight ranges for polymers of this type. Its density can be controlled in the 0.94–0.96 g./ml. range, its melting point in the 125–140° C. range, and its tensile strength in the 2,000–4,000 p.s.i. range, likewise by variation in catalyst composition and polymerization conditions.

This invention and its advantages will be better understood by reference to the following examples:

Examples I–VII

Seven activated $n$Al-AlCl$_3$ mixtures were prepared by milling the components together in stainless steel jars with chrome alloy steel balls as the grinding medium. The composition of the charges and the milling conditions are shown in Table I. Finely divided powders were obtained in most cases but as indicated in the table, while 4 days of ball milling a 12Al-1AlCl$_3$ mixture (Example I) resulted in the formation of a finely divided aluminum colored product, 14 days of milling the same mixture (Example II) resulted in severe caking and in the formation of a considerably darker product. 14 days of ball milling an 8Al-1AlCl$_3$ mixture in a 2.5 l. jar also resulted in appreciable caking (Example III) while milling of the same mixture for the same time in a 7.7 l. jar resulted in only slight caking (Example IV). Very dark products having a color approaching that of finely divided iron powder were obtained in both cases. The finely divided products from milling 6Al-1AlCl$_3$ (Example V), 5Al-1AlCl$_3$ (Example VI) and 3Al-1AlCl$_3$ (Example VII) were also considerably darker than the starting materials.

The pronounced deepening in color indicated the changes happening during the grinding, since milling of aluminum powders according to previously known techniques has always yielded powders of a color typical for aluminum. Particularly surprising was the dark color of the 5Al-1AlCl$_3$ and 3Al-1AlCl$_3$ preparations, since these contained 50 and 62% of colorless AlCl$_3$, respectively. However, this observation became less surprising once it had been established that the grinding had a unique effect, since these preparations were milled under unusually favorable conditions, i.e., in a 7.7 l. jar instead of a 2.5 l. jar and with no caking taking place. That milling in a 7.7 l. jar was more efficient than milling in a 2.5 l. jar was established in other experimental series, but was also indicated in this series (cf., Examples III and IV).

The milling was carried out at ambient temperature but some temperature rise in the reaction mixture occurred because of the severe physical forces exerted on the mixture.

TABLE I.—ACTIVATION OF ALUMINUM BY BALL MINING WITH AlCl$_3$

| Example | I | II | III | IV | V | VI | VII |
|---|---|---|---|---|---|---|---|
| Charge: | | | | | | | |
| Aluminum Powder, g.[a] | 324 | 324 | 324 | 1,296 | 324 | 810 | 486 |
| AlCl$_3$, g | 133.4 | 133.4 | 200 | 800 | 266.7 | 800 | 800 |
| Al/AlCl$_3$, Molar Ratio | 12 | 12 | 8 | 8 | 6 | 5 | 3 |
| Milling Conditions—Grinding Medium (chrome alloy steel balls): | | | | | | | |
| Jar Size, l | 2.5 | 2.5 | 2.5 | 7.7 | 2.5 | 7.7 | 7.7 |
| Time, days | 4 | 14 | 14 | 14 | 14 | 14 | 14 |
| Color of Product | Aluminum | Dark metallic | Very dark, slightly lighter than IV | Very dark, like iron powder | Dark bluish, metallic | Very dark, almost like iron powder | Lighter than VI |
| Remarks | | Caked [b] | Caked [c] | Slight caking | | | |

[a] Alcoa #123, average particle diameter, 16 microns.
[b] After the cake had been broken up, 66.7 g. AlCl$_3$ was added to the jar to bring the Al/AlCl$_3$ ratio to 8 and the milling continued. No caking took place during the first 4½ hours of grinding, but it had occurred after 7 hours.
[c] 200 g. of the caked material were broken up and charged to a 1.02 l. steel jar and milled for 2 hours. This yielded a finely divided powder containing only a few small lumps.

Examples VIII–XV

The unexpectedly high activity of the catalysts of this invention was demonstrated in a series of ethylene polymerizations carried out in 0.28 l. rocking steel bombs, (Table 2). Each catalyst was prepared by slurring in 150 ml. n-heptane the amount of the 6Al=1AlCl$_3$ mixture prepared according to Example V which corresponded to the desired quantity of aluminum and then adding the amounts of AlCl$_3$ and TiCl$_4$ needed to obtain the final catalyst composition.

The catalyst-diluent mixture was then transferred to a 0.28 l. steel bomb which was placed in a rocking heater and charged with 20 g. of purified, air and moisture free ethylene. The bomb was then rapidly heated to 150° C. This caused the pressure to increase from about 350 p.s.i.g. to about 500 p.s.i.g. somewhat depending upon the initial activity of the catalyst. The temperature was then maintained at 150° C. for 4 hours with more ethylene being added as needed to maintain the pressure at 500 p.s.i.g. Upon cooling and venting the bomb, the polymer was recovered by first putting it into 300 ml. dry isopropanol containing about 1 ml. acetylacetone and then treating the mixture in a Waring blender. After having been filtered off, the polymer was again treated with isopropanol in the blender and finally dried in vacuo at about 50° C. The combined filtrates were evaporated on a steam bath to obtain the combined weight of catalyst residues and oily or waxy polymer.

As can be seen from the results reported in Table 2, plastic grade polyethylenes of good physical properties were obtained in good yields in all cases, even through the catalyst compositions varied widely, i.e., the molar ratio of total Al/Ti from 0.4 to 4, of Al/AlCl$_3$, from about 0.7 to 5, and of Al (metal)/TiCl$_4$ from 0.3–3.

For comparison purposes a series of polymerization experiments were also carried out with atomized aluminum in place of the aluminum supplied as the 6Al=1AlCl$_3$ mixture of Example V. No recoverable polymers were obtained even though the polymerizations were otherwise carried out under the same conditions as were used for Examples VIII–XV.

TABLE 2.—ETHYLENE POLYMERIZATION IN ROCKING BOMBS

| Example | VIII | IX | X | XI | XII | XIII | XIV | XV |
|---|---|---|---|---|---|---|---|---|
| Bomb Size, l | 0.28 | 0.28 | 0.28 | 0.28 | 0.28 | 0.28 | 0.28 | 0.28 |
| Catalyst: | | | | | | | | |
| Al, g.[a] | 0.075 | 1/30 | 0.05 | 1/12 | 1/12 | 0.15 | 0.075 | 0.15 |
| AlCl$_3$, g.[b] | 0.125 | 1/12 | 0.25 | 7/12 | 1/12 | 0.25 | 0.125 | 0.25 |
| TiCl$_4$, g.[c] | 1.75 | 0.35 | 0.35 | 0.35 | 0.35 | 0.35 | 0.175 + | 0.35 |
| Al/Ti Ratio | 0.4 | 1 | 2 | 4 | 2 | 4 | 4 | 4 |
| Monomer and Diluent: | | | | | | | | |
| Ethylene, g.[d] | 27 | 30 | 24 | 48 | 40 | 48 | 27 | 35 |
| Diluent type | (*) | (¹) | (¹) | (¹) | (¹) | (¹) | (¹) | (**) |
| Volume, ml | 150 | 150 | 150 | 150 | 150 | 150 | 150 | 150 |
| Reaction Conditions: | | | | | | | | |
| Max. Temperature, °C | 150 | 151 | 152 | 154 | 152 | 150 | 150 | 150 |
| Av. Temperature, °C | 150 | 150 | 152 | 150 | 150 | 150 | 150 | 150 |
| Run Length, hours | 4 | 4 | 4 | 4 | 4 | 4 | 4 | 4 |
| Results: | | | | | | | | |
| Solid Polymer, g | 20.9 | 34 | 19.1 | 49.2 | [e]37.7 | 42.5 | 27.0 | 35.4 |
| Catalyst Eff., g./g.[f] | 10.7 | 7.3 | 29.4 | 48.3 | 72.9 | 56.7 | 72.0 | 47.2 |
| Filtrate Residues, g.[g] | 4.2 | 0.7 | 3.1 | 8.6 | 2.4 | 3.2 | 1.3 | 2.8 |
| Properties of Solid Polymer: | | | | | | | | |
| Molecular Weight×10⁻³ [h] | 140 | 430 | 400 | 120 | 2,690 | 290 | 550 | 350 |
| Density, g./ml | | | 0.952 | 0.949 | 0.950 | 0.956 | 0.954 | 0.9603 |
| M.P., °C | 140 | 126 | 122 | 131 | 133 | 130 | 129 | 138 |
| Tensile Strength, p.s.i. | | | | | 3,150 | 3,710 | 3,520 | |

[a] Supplied as activated 6Al-1AlCl$_3$ mixture prepared by milling the components with steel balls for 14 days as described in Example V.
[b] Part as 6Al-AlCl$_3$ mixture, see (a), and part as pure compound.
[c] Baker's purified.
[d] 20 g. ethylene was added at room temperature and the bombs heated to 150 °C. More ethylene was then added as needed to maintain the pressure at 500 p.s.i.g. throughout the run.
[e] A particularly pure ethylene supplied by the Bayway Refinery of the Humble Oil and Refining Company was used in this experiment.
[f] Calculated on solid polymer only.
[g] Combined weight of ash and oily or waxy polymer.
[h] According to the Chiang equation (J. Polymer Sci., 36, 91 (1959)).
* n-C$_7$.  ** n-C$_7$/xylene (95/5).

Examples XVI–XX

To realize better the full potentials of the highly active polymerization catalysts prepared according to this invention, a series of experiments was carried out in the same manner as described for Examples VIII–XV but with smaller amounts of catalyst being used, (Table 3). This time even higher yields of white, plastic grade polyethylene, up to 233 g. per g. of total catalyst, were obtained while the formation of waxy polymer was suppressed to the 1–2% level.

To make a comparison with results obtained with an aluminum powder activated according to a previously known method, 120 g. aluminum powder Alcoa #123 and 80 g. n-heptane were first milled together in a 1.02 l. stainless steel jar for 14 days with chrome alloy steel balls as the grinding medium. The milled aluminum powder, which had the normal light aluminum color was then filtered off under inert conditions and dried in vacuo on a steam bath. It was then tested in place of aluminum from the 6Al=1AlCl$_3$ mixture of Example V in polymerizations otherwise identical to those described in Examples XVI–XX. Only small amounts of polymer, never exceeding 2 g., were formed. Heavy contamination with unreacted aluminum metal was apparent in all cases.

To confirm previous knowledge that aluminum powder cannot be ball milled dry, attempts were made to mill such powder in both 1.02 and 2.5 l. jars and with a variety of charges. Severe caking occurred in all cases within less than one day of milling.

TABLE 3.—ETHYLENE POLYMERIZATION IN ROCKING BOMBS
[4 hrs. at 150° C.]

| Example | XVI | XVII | XVIII | XIX | XX |
|---|---|---|---|---|---|
| Bomb Size, l | 0.28 | 0.28 | 0.28 | 0.28 | 0.28 |
| Catalyst: | | | | | |
| Al, mg.[a] | 12.5 | 21 | 21 | 11 | 37.5 |
| AlCl$_3$, mg.[b] | 62.5 | 146 | 21 | 9 | 63 |
| TiCl$_4$, mg.[c] | 88 | 88 | 88 | 44 | 88 |
| Al/Ti Ratio | 2 | 4 | 2 | 2 | 4 |
| Monomer and Diluent: | | | | | |
| Ethylene Initially Added, g.[d] | 21 | 30 | 27 | 27 | 26 |
| n-Heptane, ml | 150 | 150 | 150 | 150 | 150 |
| Results: | | | | | |
| Solid Polymer, g | 18.4 | 28.5 | 30.3 | 13.9 | 32.6 |
| Catalyst Eff., g./g.:[e] | | | | | |
| On Total Catalyst | 113 | 112 | 233 | 217 | 176 |
| On TiCl$_4$ Only | 209 | 324 | 345 | 316 | 371 |
| Filtrate Residues, g.[f] | 0.5 | 1.3 | 0.5 | 0.2 | 1.0 |
| Properties of Solid Polymer: | | | | | |
| Molecular Weight×10⁻³ [g] | 2,290 | 1,860 | 3,090 | 1,620 | 2,190 |
| Density, g./ml | 0.9514 | 0.9519 | 0.9425 | | 0.9513 |
| M.P., °C | 132 | 142 | 144 | 133 | 143 |
| Tensile Strength, p.s.i. | | 3,310 | 3,190 | | 3,330 |

[a] Added as activated 6Al-1AlCl$_3$ mixture prepared by milling the components with steel balls for 14 days as described in Example V.
[b] Added in part as 6Al-1AlCl$_3$ mixture.
[c] Baker's purified.
[d] More ethylene was added during polymerization to maintain pressure at 500 p.s.i.g.
[e] Calculated on solid polymer only.
[f] Combined weight of catalyst residues and oily or waxy polymer. The catalyst residues normally correspond to at least twice the weight of the original catalyst components.
[g] According to the Chiang equation (J. Polymer Sci., 36, 91 (1959)).

Examples XXI–XXIII

The unusual and unexpected activity of the catalysts prepared according to this invention was further demonstrated in polymerization experiments carried out at 80 and 100° C. and at moderate pressures (Table 4). The general catalyst preparation, polymerization, and polymer recovery procedures were the same as described in previous examples. As can be seen from the table, very good yields of plastic grade polyethylene were again obtained even though rather mild reaction conditions were used and the polymerization time was only 2 hours.

Attempts to obtain solid polymer by substituting Alcoa #123 or the Alcoa #123 ball milled in n-heptane for the aluminum in the activated 8Al-1AlCl₃ and 5Al-1AlCl₃ mixtures used in Examples XXI–XXIII were unsuccessful. Further attempts to substitute an aluminum powder ball milled in Varsol for the activated n-Al-1AlCl₃ mixtures gave only small amounts of polymer, in the order of 1–2 g.

TABLE 4.—ETHYLENE POLYMERIZATION IN ROCKING BOMBS

| Example | XXI | XXII | XXIII |
|---|---|---|---|
| Bomb Size, l | 0.28 | 0.28 | 0.28 |
| Catalyst: | | | |
| Al, mg | a 37.5 | b 21 | b 21 |
| AlCl₃, mg.c | 63 | 21 | 21 |
| TiCl₄, mg | 88 | 88 | 88 |
| Al/Ti Ratio | 4 | 2 | 2 |
| Monomer and Diluent: | | | |
| Ethylene Initially Added, g | d 10 | d 10 | e 10 |
| n-Heptane, ml | 150 | 150 | 150 |
| Reaction Conditions: | | | |
| Temperature, ° C | 80 | 80 | 100 |
| Run Length, hrs | 2 | 2 | 2 |
| Results: Solid Polymer, g | 16.7 | 14.2 | 22.4 |
| Catalyst Efficiency, g./g.: f | | | |
| On total Catalyst | 89 | 109 | 172 |
| On TiCl₄ Only | 190 | 161 | 244 |
| Filtrate Residues, g.g | 0.2 | 1.3 | 0.5 |
| Properties of Solid Polymer: | | | |
| Molecular Weight×10⁻³ h | 2,320 | 600 | 480 |
| Density, g./ml | 0.938 | 0.948 | 0.954 |
| M.P., ° C | 144 | 134 | 134 | a Added as activated 8Al-1AlCl₃ mixture prepared according to Example III. The fine powder obtained after milling the caked material for 2 hrs. was used.
b Added as activated 5Al-1AlCl₃ mixture prepared according to Example VI.
c Added in part as nAl-1AlCl₃ mixture.
d More ethylene was added during polymerization to maintain pressure at 150 p.s.i.g.
e More ethylene was added during polymerization to maintain pressure at 200 p.s.i.g.
f Calculated on solid polymer only.
g Combined weight of catalyst residues and waxy polymer.
h According to the Chiang equation (J. Polymer Sci., 36, 91 (1959).

Example XXIV

That the catalysts of this invention also exhibit activity at room temperature was demonstrated in the following polymerization experiment. 6 g. of the 12Al-1AlCl₃ mixture prepared according to Example I and 10 g. TiCl₄ were charged together with 500 ml. n-heptane to a 1.4 l. steel bomb. The bomb was then transferred to a rocking heater and ethylene pressured in at room temperature to 500 p.s.i.g. a very exothermic reaction started immediately, causing the temperature of the bomb to rise to 160° C. in 6 min. even though no heating was applied. The simultaneously occurring pressure drop indicated that about 90 g. of the 140 g. of ethylene initially added had polymerized. After a slight cooling, heat was applied and the polymerization allowed to continue at 150° C. for 4 hours while more ethylene was added to maintain the pressure at 500 p.s.i.g. throughout the experiment. By employing the previously described recovery procedure, 149.6 g. of plastic grade polyethylene having a molecular weight of 240,000 and a density of 0.950 g./ml. was obtained. Most of this polymer was evidently formed during the early stages of the reaction, since the monomer absorption was rather slow during the isothermic period, probably because much of the catalyst had been coated with polymer which made it unavailable for further reaction.

Examples XXV–XXX

Since the agitation in rocking bombs is usually quite poor, formation of polymer lumps which contain unexposed catalyst is often encountered, especially when the catalysts exhibit high activity. This results in poor utilization of the catalyst. To overcome this, a series of polymerizations was carried out in a magnetically agitated 2 l. stainless steel Recipromix unit. See Table 5.

The catalysts, which had the compositions indicated in the table, were prepared by mixing their components in 1 l. of dry n-heptane in a 1 l. addition funnel. The catalyst-diluent mixture was then transferred to the Recipromix unit and ethylene pressured in at room temperature to a pressure of about 60 p.s.i.g. This usually corresponded to an ethylene addition of about 30 g. The reactor was then heated to 90° C. and kept at this temperature for 1 hour under continuous agitation. More ethylene was added from the moment the temperature reached 90° C. and until the termination of the reaction to maintain the pressure between 90 and 100 p.s.i.g. The polymerization was terminated by the addition of a small amount of isopro- TABLE 5.—ETHYLENE POLYMERIZATION IN 2 l. RECIPROMIX UNIT

| Example | XXV | XXVI | XXVII | XXVIII | XXIX | XXX |
|---|---|---|---|---|---|---|
| Catalyst: | | | | | | |
| Al Powder | | | | | | |
| Type | Example VII | Example VI | Example IV | Example V | Ball Milled a | Ball Milled. b |
| | 3Al-1AlCl₃ | 5Al-1AlCl₃ | 8Al-1AlCl₃ | 6Al-1AlCl₃ | Pure Al | Pure Al. |
| Weight, mg | 290 | 290 | 290 | 290 | 290 | 290. |
| AlCl₃, mg. c | 480 | 480 | 480 | 480 | 480 | 480. |
| TiCl₄, mg | 1,350 | 1,350 | 1,350 | 1,350 | 1,350 | 1,350. |
| Al/Ti Ratio | 2 | 2 | 2 | 2 | 2 | 2. |
| Reaction Conditions: | | | | | | |
| n-Heptane, l | 1 | 1 | 1 | 1 | 1 | 1. |
| Temperature, ° C | 90 | 90 | 90 | 90 | 90 | 90. |
| Pressure, Max. p.s.i.g | 100 | 100 | 100 | 100 | 100 | 100. |
| Pressure, Min. p.s.i.g | 90 | 90 | 90 | 90 | 90 | 90. |
| Run Length, Hr | 1 | 1 | 1 | 1 | 1 | 1. |
| Results: | | | | | | |
| Solid Polymer, g | 49 | 210 | 310 | 183 | 0 | 0. |
| Catalyst Efficiency, g./g.: | | | | | | |
| On Total Catalyst | 23.1 | 99.0 | 146.0 | 86.5 | | 0.47. |
| On TiCl₄ Only | 36.3 | 155.8 | 230.0 | 136.0 | | 0.74. |
| Properties of Solid Polymer: | | | | | | |
| Mol. Wt. ×10⁻³ d | 275 | 140 | 140 | 160 | | |
| Density, g./ml | .9626 | .9537 | .9526 | .9611 | | | a Alcoa #123 ball milled in n-heptane as described in Examples XVI–XX.
b Ball milled in Varsol by Alcoa as described in Examples XXI–XXIII.
c Where indicated, added in parts as nAl-1AlCl₃ mixture.
d According to the Chiang equation (J. Polymer Sci., 36, 91 (1959)).

panol and the polymer worked up essentially as described in previous examples.

The results reported in Table 5 clearly demonstrate the tremendous superiority of the new catalysts, particularly those made from 5Al-1AlCl$_3$, 6Al-1AlC$_{-3}$, and 8Al-1AlCl$_3$, over similarly composed catalysts made from aluminum powders activated according to previously known methods.

Example XXXI

A polymerization was carried out as described for Example XX but with 170 mg. TiBr$_4$ being used in place of the TiCl$_4$. After the normal recovery procedure, 8.6 g. of plastic grade polyethylene was obtained.

Example XXXII

An ethylene polymerization was carried out in the 2 l. Recipromix unit essentially as described for Examples XXV–XXX but with a catalyst consisting of 0.29 g. Al (supplied as the remilled fine 8Al-1AlCl$_3$ powder of Example III), 0.48 g. AlCl$_3$ and 1.25 g. VCl$_4$. After a polymerization time of 2 hours at 90° C., 162 g. of plastic grade polyethylene having a molecular weight of 430,000 were obtained.

The above Examples VIII–XXXII clearly demonstrate the superiority of the catalysts made according to this invention over similarly composed catalysts made from conventional atomized aluminum powder or from aluminum powders activated according to previously known methods.

Example XXXIII

In order to demonstrate the difference in reactivity between mixtures of aluminum and aluminum chloride which are dark in color and mixtures of aluminum chloride and aluminum which are not dark in color, the following data in Tables 6 and 7 were obtained.

The runs in these tables were carried out by the procedures described in the examples of this application except as otherwise indicated; in fact, runs B and D correspond to Examples V and III.

It can be seen that the experiments in Table 6 above show run A which was a light colored aluminum-aluminum chloride product and runs B–D which were products having a color considerably darker than that of run A or of the original aluminum-aluminum chloride mixture prior to treatment.

When used as catalyst components in ethylene polymerization according to this application, the darker preparations gave excellent yields, i.e. 81–130 g., of a polymer of good physical properties, while the lighter preparation gave a much poorer yield, i.e. 5 g., of a polymer of an apparently low mol. wt., run E. This agrees completely with the disclosure in the application. See col. 1, lines 45–64 and col. 2, lines 1–7 and col. 2, lines 41–61. It demonstrates that the grinding of the metallic powder must be carried out under conditions which will cause a considerable darkening of the metallic color if good yields of a polymer of attractive properties are to be obtained under conditions of moderate pressure and temperature. It should be noted that the application discloses that catalyst efficiencies in the range of 50–500 g. polymer per g. catalyst are desirable. See col. 4, lines 53–56. Thus, the results of runs F–H are clearly within this range while those of run E are not.

The combined data of Tables 6 and 7 also demonstrate another important point. That is, the activation of the metallic powder is not just a function of the time of grinding. This is in agreement with the disclosure in the application, where it is stated in col. 2, line 23 to col. 3, line 55, that the activation depends both upon the time and the efficiency of grinding, and that the latter depends upon (1) the type of grinding equipment used, (2) the equipment size, (3) the relative charge, (4) the particle size of the aluminum powder and (5) the Al/AlCl$_3$ ratio. Except for the difference in Al/AlCl$_3$ ratio, the powders of runs A, B and D were milled under the same conditions and for the same length of time. The lower activation obtained at lower Al/AlCl$_3$ ratios made this treatment unsatisfactory for the 2Al-1AlCl$_3$ mixture of run A, however.

TABLE 6.—PREPARATION OF ACTIVIATED ALUMINUM POWER

| Sub Example | A | B [a] | C | D [b] |
|---|---|---|---|---|
| Al/AlCl$_3$, Ratio | 2 | 6 | 6 | 8. |
| Mill Type | Ball Mill | Ball Mill | Vibratom [c] | Ball Mill. |
| Grinding Medium | Steel Balls | Steel Balls | Steel Balls | Steel Balls. |
| Milling Time, days | 14 | 14 | 1 | 14. |
| Color of Product | Light aluminum. | Dark bluish metallic. | Very dark metallic. | Very dark metallic. |

[a] Corresponds to Example V.
[b] Corresponds to Example III.
[c] A mill in which the jar is subjected to a swinging action and in which the effective density of the grinding medium is increased through the action of centrifugal force. See col. 2, lines 2–3 and col. 3, lines 1–7.

TABLE 7.—ETHYLENE POLYMERIZATION IN A 2 LITER RECIPROMIX UNIT [d]

| Example | E | F | G | H |
|---|---|---|---|---|
| Catalyst: | | | | |
| Al Powder | Example A | Example B | Example C | Example D. |
| Type | 2Al-1AlCl$_3$ | 6Al-1AlCl$_3$ | 6Al-1AlCl$_3$ | 8Al-1AlCl$_3$. |
| Weight, mg | 0.29 | 0.29 | 0.29 | 0.29. |
| AlCl$_3$, mg.[a] | 0.48 | 0.48 | 0.48 | 0.48. |
| TiCl$_4$, mg | 0.68 | 0.68 | 0.68 | 0.68. |
| Al/AlCl$_3$/TiCl$_4$ Molar Ratio | 3/1/1 | 3/1/1 | 3/1/1 | 3/1/1. |
| Reaction Conditions: | | | | |
| n-Heptane, l | 1.0 | 1.0 | 1.0 | 1.0. |
| Temperature, ° C | 90 | 90 | 90 | 90. |
| Pressure, max. p.s.i.g | 102 | 100 | 100 | 100. |
| Pressure, min. p.s.i.g | 93 | 90 | 90 | 90. |
| Run Length, hr | 1 | 1 | 1 | 1. |
| Results: | | | | |
| Solid Polymer g | 5 [b] | 81 | 130 | 123. |
| Catalyst Efficiency g./g.: | | | | |
| On Total Catalyst | 3.5 | 56 | 90.2 | 85.5. |
| TiCl$_4$ Only | 7.4 | 120 | 192 | 182. |
| Properties of Solid Polymer: | | | | |
| Mol. Wt.×10$^{-3}$ [c] | | 150 | 185 | 190. |
| Density, g./cc | | 0.960 | 0.953 | 0.950. |
| Tensile Strength, p.s.i | | 3,600 | | |

[a] Added in part as nAl-1AlCl$_3$ mixture.
[b] Solid but of low molecular weight.
[c] According to the Chiang equation (J. Polymer Sci. 36, 91 (1959)).
[d] This unit is supplied by Pressure Products Incorporated of Hatboro, Pennsylvania. It is a closed reaction unit which has a shaft with discs on it. The shaft is magnetically actuated by an alternating current which causes the shaft to move up and down in the reactor thus permitting effective agitation.

Along the same lines, runs C and G demonstrate that more rapid activation can be obtained in grinding equipment in which centrifugal force is allowed to act on the balls as disclosed above. Although one day of grinding was used in this case, it is obvious from the catalyst efficiency, 90.2 g./g., that satisfactory results could have been obtained in even a shorter time.

Example XXXIV

A porcelain ball mill jar of 7 ounce capacity, which was half full of 0.5 inch porcelain balls, was charged with 1.4 g. of magnesium powder and 1.9 g. of aluminum chloride inside a nitrogen containing dry box. The jar was then rotated on suitable rollers for 140 hours, whereupon the ball milled mixture was recovered inside the dry box and charged to a 283 ml. chrome-vanadium steel bomb together with 80 ml. of toluene.

After having been sealed inside the dry box, the bomb was transferred to a heating rocker and connected to an ethylene supply line from which dry ethylene was introduced until a pressure of 300 p.s.i.g. had been reached. The rocker was then started so as to give good agitation to the contents of the bomb which was also heated to 110° C. The rocking was then continued at this temperature for 12 hours during which period more ethylene was added so as to maintain the reactor pressure between 250 and 350 p.s.i.g. At the end of the reaction period the rocker was stopped, the heating discontinued and the bomb disconnected from the ethylene supply line.

After having reached room temperature the bomb was removed from the rocker and opened. The reactor contents were then poured into 500 ml. isopropanol acidified with HCl for the purpose of decomposing and solubilizing the catalyst components. After having been allowed to stand overnight the mixture was filtered through a Buchner funnel. A small amount of magnesium powder, which could be dissolved by the action of strong HCl, was recovered on the filter paper, but not even a trace of solid polyethylene was found present in the mixture.

Example XXXV

A mixture of 5.4 g. magnesium powder and 13 g. aluminum chloride was ball milled for 140 hours in a 7 ounce porcelain jar and then used as a catalyst for polymerizing ethylene as described in Example XXXIV. Not even a trace of solid polyethylene was found when the reaction mixture was recovered and treated as described in the previous example.

Example XXXVI

A 220 mm. long and 35 mm. outside diameter heavy (3 mm.) walled Carius tube was charged with 15.2 g. magnesium powder and 16.5 g. $AlCl_3$ inside a nitrogen containing dry box. The tube was then cooled to about −70° C. and evacuated to about 0.1 mm. Hg, whereupon it was sealed and heated inside a steel bomb for 18 hours at 300° C. After the bomb had cooled down to room temperature, the tube was removed and opened inside the dry box. A 12 g. aliquot of the heated mixture was then ball milled in a 7 ounce porcelain jar for 140 hours as described in Example XXXIV.

Six g. of the ball milled mixture and 100 ml. toluene were then charged to a nitrogen blanketed 500 ml. reaction flask equipped with stirrer, thermowell, ethylene addition tube and condenser. The mixture was then heated to 90° C. under good stirring at which temperature ethylene addition through the dip tube was started. The ethylene addition was continued for 2 hours under good stirring at this temperature, whereupon the reaction mixture was poured into 500 ml. acidified isopropanol and treated as described in Example XXXIV. Not even a trace of solid polyethylene was found.

The advantages of this invention will be apparent to the skilled in the art. Improved catalyst systems are provided for polymerizing ethylene at mild conditions to products of superior characteristics in high efficiencies with reduced ash problems.

It is to be understood that this invention is not limited to the specific examples which have been offered merely as illustrations and that modifications may be made without departing from the spirit of the invention.

What is claimed is:

1. A process for preparing a catalyst comprising 0.1 to 5 moles of $AlCl_3$ and 0.5 to 10 atoms of aluminum per mole of a transition metal halide selected from the group consisting of $TiCl_4$, $TiBr_4$ and $VCl_4$, said catalyst being suitable for polymerizing ethylene, which consists of grinding in a dry inert environment a mixture of finely divided aluminum powder with at least a portion of the $AlCl_3$ until at least a darkening in color of said aluminum powder in the resulting mixture occurs, the aluminum/ $AlCl_3$ molar ratio being about a minimum of 3:1, and a maximum insufficient to cause caking before said darkening, and then admixing the thus ground material with the transition metal chloride and residual $AlCl_3$.

2. The process of claim 1 in which the grinding step is carried out at a temperature in the range of 0 to 175° C.

3. The process of claim 2 in which the grinding is carried out for from 1–15 days.

4. The process of claim 3 in which the transition metal halide is $TiCl_4$.

5. The catalyst prepared according to claim 1.

6. The catalyst prepared according to claim 4.

7. A process for preparing solid crystalline polyethylene which comprises contacting ethylene in an inert hydrocarbon diluent at a temperature in the range of about 50–180° C. with the catalyst of claim 5.

8. The process of claim 7 in which a pressure in the range of 25–700 p.s.i.g. is employed.

9. The process of claim 8 in which the transition metal halide is $TiCl_4$.

10. The process of claim 9 in which a catalyst concentration of 0.05–2 wt. percent based on ethylene is employed.

11. The process of claim 7 carried out in the additional presence of a minute quantity of an activating material selected from the group consisting of HCl, HBr, HI, water, alcohols and organic acids.

12. A process for preparing a catalyst which comprises grinding in a dry form finely divided aluminum powder with $AlCl_3$ in a molar ratio of aluminum/$AlCl_3$ of about 3:1 to 12:1 in an inert atmosphere until the color of the thus contacted aluminum and $AlCl_3$ considerably darkens without caking and then admixing the thus contacted, darkened aluminum and $AlCl_3$ with a transition metal halide selected from the group consisting of $TiCl_4$, $TiBr_4$ and $VCl_4$.

13. A process according to claim 12 wherein said molar ratio is 6:1 to 12:1.

14. The process of claim 12 in which the molar ratio of aluminum to $AlCl_3$ is about 6:1 to 8:1.

15. The process of claim 12 in which the finely divided aluminum has an average particle diameter of no more than about 100 microns.

16. A process according to claim 12 wherein said grinding medium is steel balls.

17. A process for preparing a catalyst which comprises dry ball milling finely divided aluminum powder with $AlCl_3$ with chrome alloy steel balls in an inert atmosphere for about 14 days at approximately room temperature, the molar ratio of aluminum/$AlCl_3$ being about 6:1 to 8:1, and then admixing the ball milled aluminum and $AlCl_3$ with $TiCl_4$ and sufficient additional $AlCl_3$ to form a catalyst having an Al/Ti molar ratio of about 0.4:1 to 4:1.

18. The process of claim 17 in which said additional $AlCl_3$ is added near the end of the 14 days of ball milling and the ball milling is continued for a sufficient time to thoroughly mix said additional $AlCl_3$ with the ball milled aluminum and $AlCl_3$.

19. A process for preparing solid crystalline polyethylene which comprises contacting ethylene in an inert hydrocarbon diluent at a temperature in the range of about 50 to 180° C. with the catalyst prepared by the process of claim 18.

References Cited

UNITED STATES PATENTS

| | | | |
|---|---|---|---|
| 3,007,909 | 11/1961 | Raecke | 260—94.9 |
| 3,037,012 | 5/1962 | Lehnerer et al. | 260—94.9 |
| 3,093,625 | 6/1963 | Friederich et al. | 260—94.9 |

FOREIGN PATENTS 811,909   4/1959   Great Britain.

JOSEPH L. SCHOFER, *Primary Examiner.*

L. EDELMAN, *Assistant Examiner.*

U.S. Cl. X.R.

252—442; 260—93.7